(12) United States Patent
Garg et al.

(10) Patent No.: US 9,454,581 B1
(45) Date of Patent: Sep. 27, 2016

(54) SEARCH WITH MORE LIKE THIS REFINEMENTS

(71) Applicant: BloomReach Inc., Mountain View, CA (US)

(72) Inventors: Ashutosh Garg, Sunnyvale, CA (US); Anand Raghuraman, Campbell, CA (US); Vinodh Kumar Ravindranath, Bangalore (IN); Mohit Jain, Bangalore (IN); Christina Augustine, Palo Alto, CA (US); Gaurav Bhati, Bangalore (IN)

(73) Assignee: BloomReach Inc., Mountain View, CA (US)

( * ) Notice: Subject to any disclaimer, the term of this patent is extended or adjusted under 35 U.S.C. 154(b) by 178 days.

(21) Appl. No.: 14/092,575

(22) Filed: Nov. 27, 2013

Related U.S. Application Data

(60) Provisional application No. 61/730,810, filed on Nov. 28, 2012.

(51) Int. Cl.
*G06F 7/00* (2006.01)
*G06F 17/30* (2006.01)

(52) U.S. Cl.
CPC ..... *G06F 17/3053* (2013.01); *G06F 17/30864* (2013.01); *G06F 17/30867* (2013.01)

(58) Field of Classification Search
CPC .................. G06F 17/30864; G06F 17/30867
USPC ........................................................ 707/709
See application file for complete search history.

(56) References Cited

U.S. PATENT DOCUMENTS

| | | | | |
|---|---|---|---|---|
| 5,675,784 A * | 10/1997 | Maxwell | ................ | G06Q 10/10 |
| 6,029,195 A * | 2/2000 | Herz | .................. | G06F 17/30867 348/E7.056 |
| 7,725,346 B2 * | 5/2010 | Gruhl | ................. | G06Q 30/0202 705/7.31 |
| 8,359,285 B1 * | 1/2013 | Dicker | ................... | G06Q 30/02 705/26.1 |
| 8,775,160 B1 * | 7/2014 | Roizen | .............. | G06F 17/30684 704/10 |
| 2002/0161664 A1 * | 10/2002 | Shaya | ..................... | G06Q 30/02 705/7.31 |
| 2012/0101918 A1 * | 4/2012 | Battle | .................... | G06Q 30/00 705/26.63 |
| 2012/0290399 A1 * | 11/2012 | England | ............. | G06Q 30/0282 705/14.66 |
| 2014/0258032 A1 * | 9/2014 | Psota | ..................... | G06Q 30/02 705/26.35 |
| 2014/0279294 A1 * | 9/2014 | Field-Darragh | ..... | G06Q 10/087 705/28 |
| 2014/0314313 A1 * | 10/2014 | Kennedy | ............... | G06T 7/0079 382/165 |
| 2014/0337174 A1 * | 11/2014 | Lin | .................... | G06Q 30/0623 705/26.61 |
| 2015/0073929 A1 * | 3/2015 | Psota | ..................... | G06Q 50/28 705/26.2 |

* cited by examiner

*Primary Examiner* — Mark E Hershley
(74) *Attorney, Agent, or Firm* — Van Pelt, Yi & James LLP

(57) ABSTRACT

Techniques for search with more like this refinements are disclosed. In some embodiments, search with more like this refinements includes receiving a product and a context (e.g., the context can include related category information, user context, and/or other context related information); generating a search query based on the product and the context; and determining a plurality of products that match the search query to generate more like this search results.

33 Claims, 7 Drawing Sheets

SEARCH WITH MORE LIKE THIS REFINEMENTS

CROSS REFERENCE TO OTHER APPLICATIONS

This application claims priority to U.S. Provisional Patent Application No. 61/730,810 entitled SEARCH WITH MORE LIKE THIS REFINEMENTS, filed Nov. 28, 2012, which is incorporated herein by reference for all purposes.

BACKGROUND OF THE INVENTION

Internet search generally refers to a process for searching for content on the Internet. For example, a web search engine is typically implemented using a software system that can search for content on the World Wide Web. The search results can be presented as a list of results.

Search engines can also be provided to search for content on a particular web site (e.g., using an embedded search engine, such as an embedded Google search engine for that web site). For example, a merchant that provides products or services for sale on a merchant's web site can provide a search box that allows users to search for particular products or services provided by the merchant. The search results in this case will typically return results of web pages available on the merchant's web site and/or particular products or services provided by the merchant.

BRIEF DESCRIPTION OF THE DRAWINGS

Various embodiments of the invention are disclosed in the following detailed description and the accompanying drawings.

DETAILED DESCRIPTION

Figure 1:
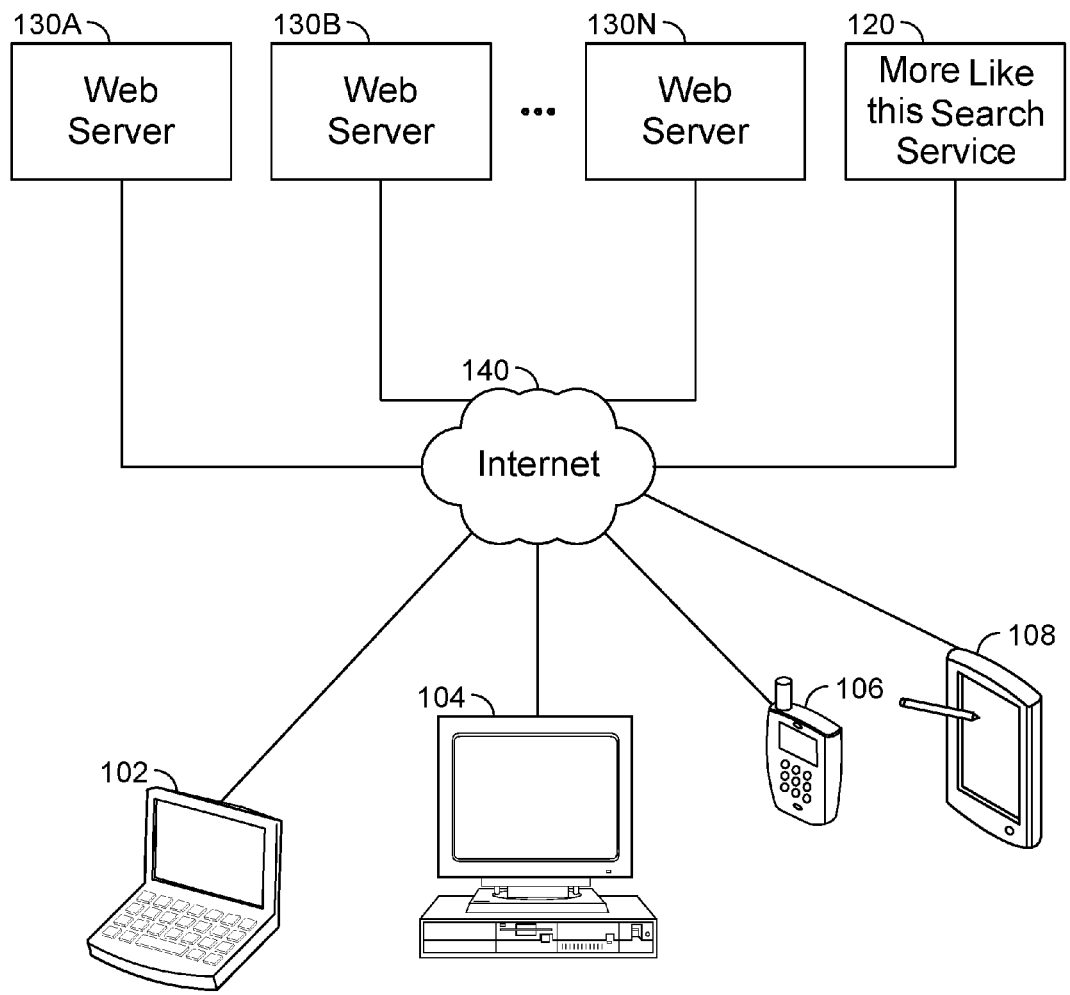
FIG. 1 is a block diagram illustrating an overview of an architecture of a system for providing search with more like this refinements in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Traditional search engines utilized by enterprises (e.g., merchants or other enterprises) for their web sites and mobile sites typically rely on manual configurations and data entry to serve search results to end users. However, these manual processes can be error prone for a number of reasons. First, traditional search engines rely on the item (e.g., product, listing, etc.) descriptions and synonyms that have been manually entered. No natural language processing is included in these search engines to account for the numerous ways an item can be described (e.g., synonyms, bigrams, etc.). In particular, existing web site solutions generally require manual ranking and entry of data. For example, such approaches require manually listing products and similar products or ranking of products.

Additionally, these search engines contain manually entered rules meant to optimize the search results for the user. However, those rules are configured once and left in place. An improved solution would involve a continual and automatic optimization through machine learning so that the search engine is responsive to and optimized for current context (e.g., demand and/or user context).

Finally, current search technology requires users to enter in keyword(s) to describe their intent for desired search results. This can be problematic as keywords may not yield a particular user's desired search results. Also, mobile solutions are challenging as users typically do not desire to type one or more keywords on such mobile devices. Also, mobile devices (e.g., smart phones, tablets, or other mobile computing devices) often have less screen space, and as a result, there is less screen space for presenting a long list of products to users (e.g., so efficient use of such limited screen space for providing such search results to users is important, and as such, ranking is generally important for mobile devices). Thus, as more users are accessing web content using a mobile device (e.g., accessing a merchant's web site through the mobile channel using a mobile device), the ability to present relevant search responses (e.g., search results) using a smaller screen space (e.g., to present relevance using few characters) is increasingly important.

In particular, current search engines do not include options that allow users to easily navigate to additional search results by simply clicking a button or other simple input for selecting more search results that are like a particular item (e.g., product) in a prior search result or otherwise presented on a merchant's web site on the product page or other page of the merchant's web site. By providing search with more like refinements, users can access product(s)/service(s) of interest in a more efficient and convenient manner.

Accordingly, techniques for search with more like this refinements are disclosed. For example, by using various data associated with an item that is identified in an initial search result (e.g., using item description, details embedded in an image for the item, and/or various other attributes associated with the item, which can be a product or service sold be the merchant) and using context related information (e.g., category associated with the item, user behavior monitored during a given user session, user profile data, and/or other user contextual information), a search can be executed that determines one or more items that are similar to the item that was identified in an initial search result. This approach can eliminate the need for the user to enter additional keywords to find such additional items that are similar to the item that was identified in an initial search result.

In some embodiments, search with more like this refinements includes receiving a product and a context (e.g., the context can include related category information, user context, and/or other context related information); generating a search query based on the product and the context; and determining a plurality of products that match the search query to generate more like this search results.

For example, assume that a user named Alice searches for a hand bag (e.g., a purse) on a clothing merchant's web site by entering a search query "hand bag" in a search box on the clothing merchant's web site. Assume that the search result shows a product that is a leather hand bag from ACME Company (e.g., in this example, the leather material of the hand bag can be a derived attribute associated with this product, and the brand information of ACME Company can be a merchant specified attribute, which can be provided within a product catalog data feed from the merchant, as further described herein). However, Alice may want to now view additional products that are similar to this leather hand bag from ACME Company. Alice can then select a more like this option (e.g., by selecting a button or other icon) in the web page to execute a search with more like this refinements to receive additional products that similar to this product. In this example, the search with more like this refinements can use the associated product attribute information to identify hand bags that are of leather material and are from ACME Company (e.g., other hand bag products that have similar product attributes).

As another example, assume that a user named Bob searches for a golf club driver on a sporting goods merchant's web site by entering a search query "driver" in a search box on the sporting goods merchant's web site. Assume that the search result shows a product that is a driver from ACME SPORTING GOODS Company (e.g., in this example, the hybrid (metal/wood) driver head material of the golf club driver can be a derived attribute associated with this product, and the brand information of ACME SPORTING GOODS Company can be a merchant specified attribute, which can be provided within a product catalog data feed from the merchant, as further described herein). However, Bob may want to now view additional products that are similar to this golf club driver from ACME SPORTING GOODS Company. Bob can then select a more like this option (e.g., by selecting a button or other icon) in the web page to execute a search with more like this refinements to receive additional products that are similar to this product (e.g., other golf club driver products that have similar attributes). Assume that earlier during Bob's web browsing session that Bob had browsed golf equipment including other types of golf clubs from another company, such as PRO GOLF CLUBS Company. In this example, the search with more like this refinements can use the user context information from Bob's browsing session history to identify golf club drivers that are of the hybrid (metal/wood) driver head material and are from PRO GOLF CLUBS Company.

As yet another example, assume that the merchant's web site has just recently added a new model of golf club driver from PRO GOLF CLUBS Company. If Bob now selects a more like this search option for products that are similar to the previously searched older model golf club driver from PRO GOLF CLUBS Company, then techniques described herein can be used to identify the new model of golf club driver, for example, by associating product attributes such as product type and brand/manufacturer and/or using product classification techniques described herein to associate the new golf club driver with a product class for golf club drivers from PRO GOLF CLUBS Company. This can be implemented as a dynamic approach based on various product and context matching/searching techniques disclosed herein, and in contrast to other approaches (e.g., collaborative filtering or manual entering/hard-coding related products), this approach does not require manual entry in a catalog or the category of the merchant's web site to be updated. Accordingly, a newly added product can be efficiently identified in a more like this search result using various techniques disclosed herein.

In one embodiment, search with more like this refinements further includes receiving a product identifier to uniquely identify the product. For example, the product identifier can be used to identify other information associated with the product (e.g., information provided for the product in a merchant's product catalog, which can be periodically provided/updated via an XML data feed or using other techniques).

In one embodiment, search with more like this refinements further includes determining a user context. For example, the user context can include user profile information. As another example, the user context can include user browsing history information (e.g., user browsing session data). In some implementations, the search query is generated based on the user context. For example, Javascript executed on a merchant's web site can send the product identifier and various user context data (e.g., pixel log data from a pixel tag on the merchant's web site) along with a more like this search request.

In one embodiment, search with more like this refinements further includes determining a product attribute associated with the product. For example, the product attribute can be a merchant specified product attribute (e.g., as provided in a merchant's product catalog). As another example, the product attribute can be a derived product attribute (e.g., an attribute that is not explicitly specified by a merchant, but which can be derived from other information associated with or specified for the product). In some implementations, the search query is generated based on the product attribute that is associated with the product.

In one embodiment, a context includes a category. For example, a category associated with the product can be the category associated with the product as provided on the merchant's web site, and the category can be used as context-based input for determining more like this search results using various techniques disclosed herein.

In one embodiment, a context includes a product class. For example, a product class can be dynamically generated and associated with the product using various techniques disclosed herein, and the product class can be used as context-based input for determining more like this search results using various techniques disclosed herein.

As further described below, these and various other features and techniques are disclosed for providing search with more like this refinements.

FIG. 1 is a block diagram illustrating an overview of an architecture of a system for providing search with more like this refinements in accordance with some embodiments. As shown, various user devices, such as a laptop computer 102, a desktop computer 104, a smart phone 106, and a tablet 108 (e.g., and/or various other types of computing devices that can access the Internet to browse, for example, merchant web sites), are in communication with Internet 140 to access various web sites provided by different web servers 130A, 130B, ..., 130N (e.g., which can each serve one or more merchant web sites).

For example, the web servers can each provide a merchant's web site, which can offer various products and/or services for sale from the merchant. The merchant web sites can also include a search function that allows users to search content on the merchant's web site. For example, users can generally use the merchant web site's search function (e.g., via a search box, such as using an embedded Google® search on the web site or other search function).

The web servers can also subscribe to a more like this search service 120 (e.g., which can be provided as a cloud-based more like this search service for merchant web sites). In some implementations, the more like this search service provides various techniques for search with more like this refinements as disclosed herein. In particular, a web server can communicate a user's query (e.g., a partially entered query) and/or other user activities performed on the merchant's web site to the more like this search service (e.g., using an API for communications over the Internet between the web server and the more like this search service, such as using secure data communications). In some implementations, the merchant's web site includes embedded code (e.g., JavaScript or other executable code) that is executed to facilitate the monitoring and interactions between the merchant's web site server and the more like this search service. For example, when a user selects a search with more like this refinements option (e.g., by selecting a button shown by a particular product item shown on the merchant's web site, which may be presented in response to a prior user's search query or on a home page or product category page, and/or on another location within the merchant's web site), then the more like this search service receives the request along with the associated product item. The more like this search service can then determine other product items with similar attributes associated with the product item and/or use associated context information to determine other product items, which can then be returned to the web server, and the web server can present one or more of the generated more like this product items to the user (e.g., as results to a search with more like this refinements in the user's browser below an embedded search box, or using other presentation techniques). In some implementations, the web server can select how many of the generated more like this product items to return to the user's browser (e.g., based on a device platform and/or other criteria, which can also include merchant specific criteria).

Figure 2:
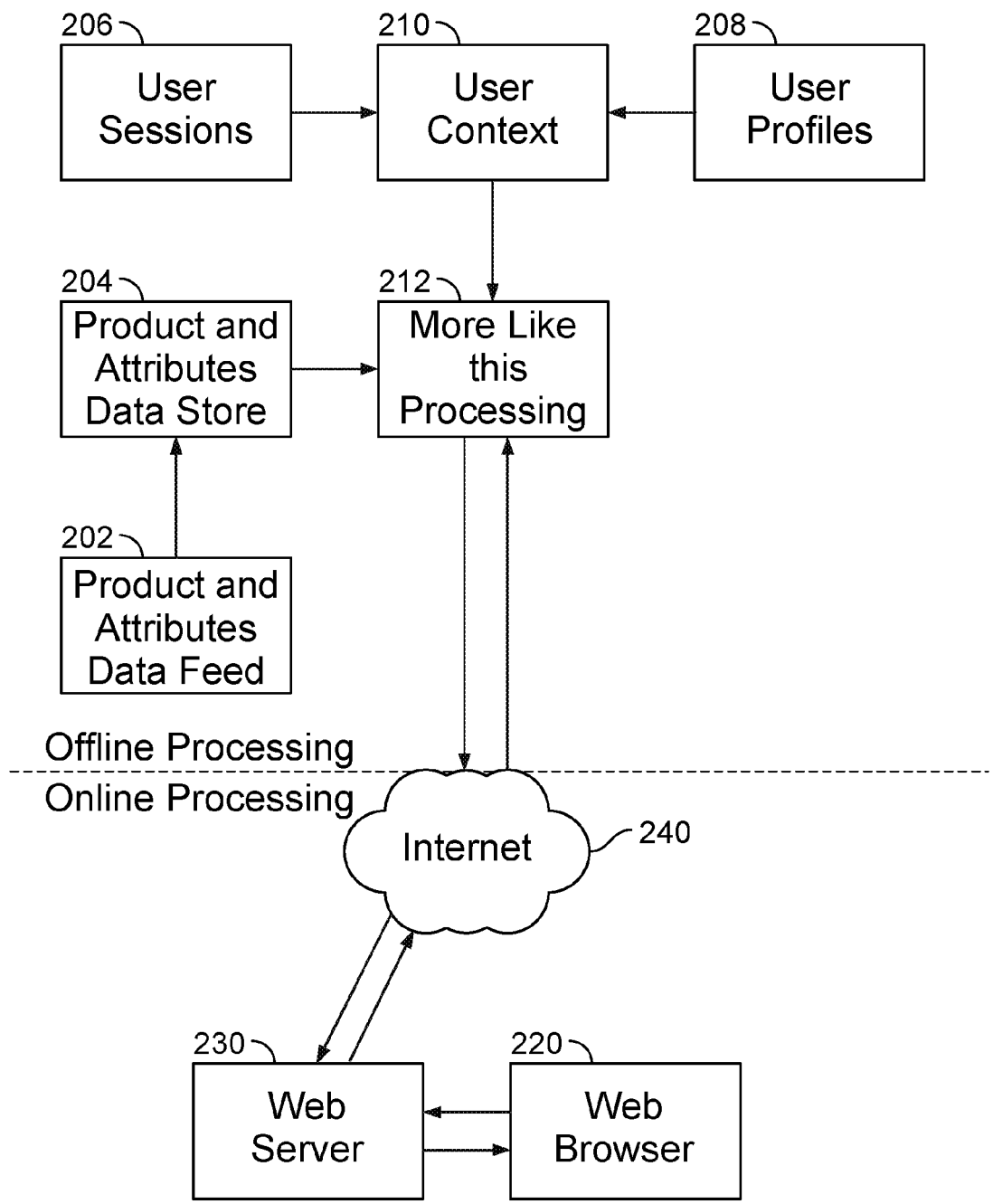
FIG. 2 is a functional block diagram illustrating a detailed view of an architecture of a system for providing search with more like this refinements in accordance with some embodiments.

FIG. 2 is a functional block diagram illustrating a detailed view of an architecture of a system for providing search with more like this refinements in accordance with some embodiments. In some implementations, a more like this search service can be implemented by performing offline processing and online processing as shown in FIG. 2. As shown, offline processing includes receiving a product and attributes data feed 202 from a merchant (e.g., a product catalog that lists products/services for sale by the merchant and any merchant specified product attribute data maintained by the merchant for each such product in the merchant's product catalog(s)), which can be stored in a product and attributes data store 204 (e.g., a database, such as an open source database, such as an Apache Cassandra database, or a commercially available database, or other data store). In some implementations, each merchant provides its respective product and attributes data feed (e.g., periodically, such as hourly, daily, weekly, or at some other interval or updates as needed). In some implementations, the product and attributes data feed 202 is provided as an XML data feed or in some other format. The respective merchant product catalogs and attributes data can be separately stored in the product and attributes data store.

In some implementations, product classes are generated that can be used to facilitate search with more like this refinements using various techniques described herein. For example, a products class generator can be implemented that dynamically generates a class of products based on attribute associations across products in a merchant's catalog of products. For example, by dynamically generating a product class for golf club drivers from PRO GOLF CLUBS Company, a newly added golf club driver from PRO GOLF CLUBS Company can be identified in a more like this search result even if the merchant's website/product catalog has not provided that new product in such a category and prior searches have not yet been generated to yield associations using other techniques, such as collaborative filtering techniques. As another example, a "shoes on sale" can be another product class that can be generated using these techniques.

An example database schema for implementing a product class is shown below, in which $P_i$ refers to a product, $W_i$ refers to an associated weight (e.g., the weight can be used as an indicator of a strength of association/relevance of the product to the product class), and Q is a function that can be applied to the ranking signal data.

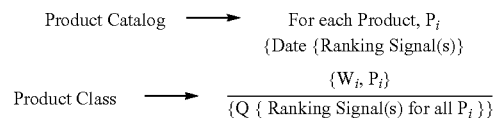

In the above database schema example for a product class, ranking signals as described herein can be used to provide related products input data over a period of time (e.g., over the last 100 days or some other period of time). In some cases, a function (Q) can be applied to such ranking signal data, which can be aggregated (e.g., as a simple sum) over the period of time or calculated using a decaying algorithm or other functions can be applied.

As also shown, user sessions data 206 is provided to user context data store 210. For example, user sessions can be monitored (e.g., using a pixel tag to monitor the behavior of users visiting a merchant's web site or using other techniques to monitor the behavior of users visiting a merchant's web site) to provide the user sessions data. As also shown, user profiles data 208 is provided to user context data store 210. For example, if a user logs into a merchant's web site and has a user profile associated with the user's login, then the user's profile data can be provided to the user context data store and associated with the user (e.g., that particular user's login account). The user context data can then be used to determine a user context as an input for processing a user's more like this request at 212. In some implementations, user sessions data 206 and user profiles data 208 are stored in a data store or as separate data stores (e.g., a data store can be implemented using an open source or commercially available database, which can be used to store such user context data, such as a user profile including a user's past purchases, a user's browse history, a user's explicit preference, and/or other information that can be used for determining a user context).

The product and attributes data store and user context are provided as input for more like this processing 212. As further described below with respect to, for example, FIGS. 3 and 4, more like this processing can include various processing techniques and operations to facilitate generating search with more like this refinements as further discussed below.

The above-described processing can be performed offline as input to be used for online system processing, which is now described below. More like this processing 212 is in communication with a merchant's web server 230 via Internet 240. In particular, a user's web browser 220 (e.g., executing a computing device, such as a mobile computing device, a desktop computer, or other computing device) can communicate a more like this search query request (e.g., including an identified product) to a merchant's web server. The web server can then communicate with the more like this processing service to determine which more like this search results to return to the user's web browser (e.g., to present to the user as a list of more like this search results in response to the user's request).

Figure 3:
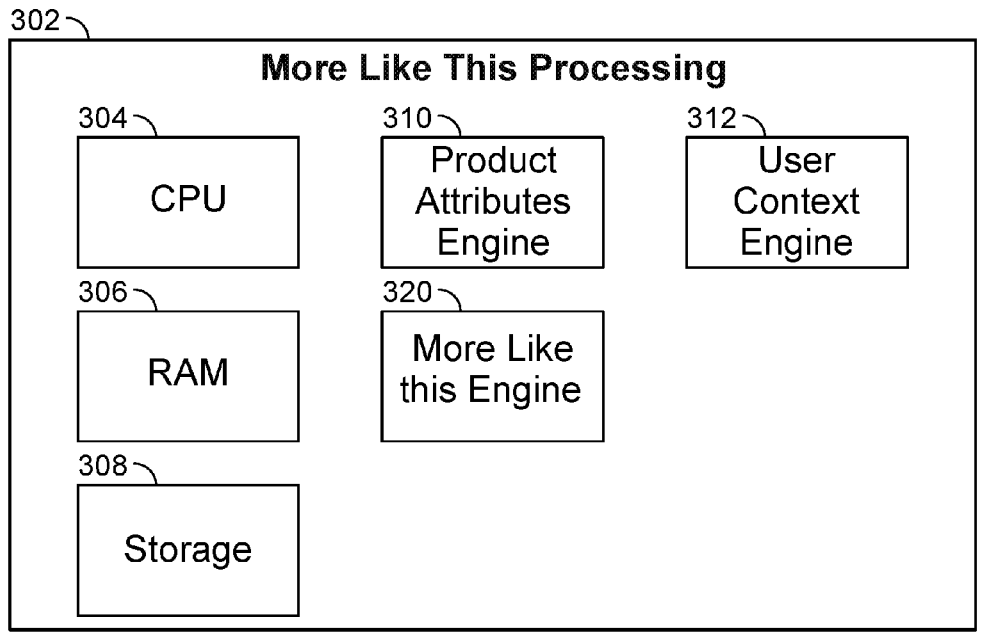
FIG. 3 is a functional block diagram illustrating a more like this processing system for providing search with more like this refinements in accordance with some embodiments.

FIG. 3 is a functional block diagram illustrating a more like this processing system for providing search with more like this refinements in accordance with some embodiments. As shown, more like this processing system 302 includes a CPU 304, a RAM 306, and a data storage 308. As also shown, the more like this processing system includes a product attributes engine 310 (e.g., the product attributes engine can be used to determine derived attributes and/or merchant specified attributes associated with an item selected by a user for a more like this search with refinements as further described below, and in some implementations, the product attributes engine can include a product class generation engine or such can be implemented as a separate engine), a user context engine 312 (e.g., using click logs/pixel tags data for monitoring user activities during a session to provide a user's browsing history, user profile data to provide information about a user including a user's explicit preferences, and/or other information about the user such as age, male/female, etc., which can each be used for determining a user context as further described below), and a more like this engine 320 (e.g., for determining items to return for a more like this search with refinements, which can use input received from the product attributes engine and/or the user context engine, as further described below), which are each further described below. In some implementations, one or more of these functions can be performed by another device or function, such as the product attributes engine and/or user context engine can be performed using another device or function, which can provide respective input to the more like this processing system. In some implementations, the more like this processing system is implemented using the Apache Solr open source framework as further described below with respect to FIG. 4.

For example, more like this processing system 302 can implement the more like this search service 120 described above with respect to FIG. 1 and can also be used to implement the more like this processing service 212 described above with respect to FIG. 2. For example, a user request for a more like this search with refinements (e.g., entered by a user on a merchant's web site by selection of a more like this search with refinements option/button to perform such a more like this search based on a particular product/item on the merchant's web site) can be processed using CPU 304 and RAM 306 to automatically generate results for a more like this search with refinements that can be stored in storage 308 and communicated to the merchant's web site for presenting to a user via the user's web browser executed on the user's computing device.

Figure 4:
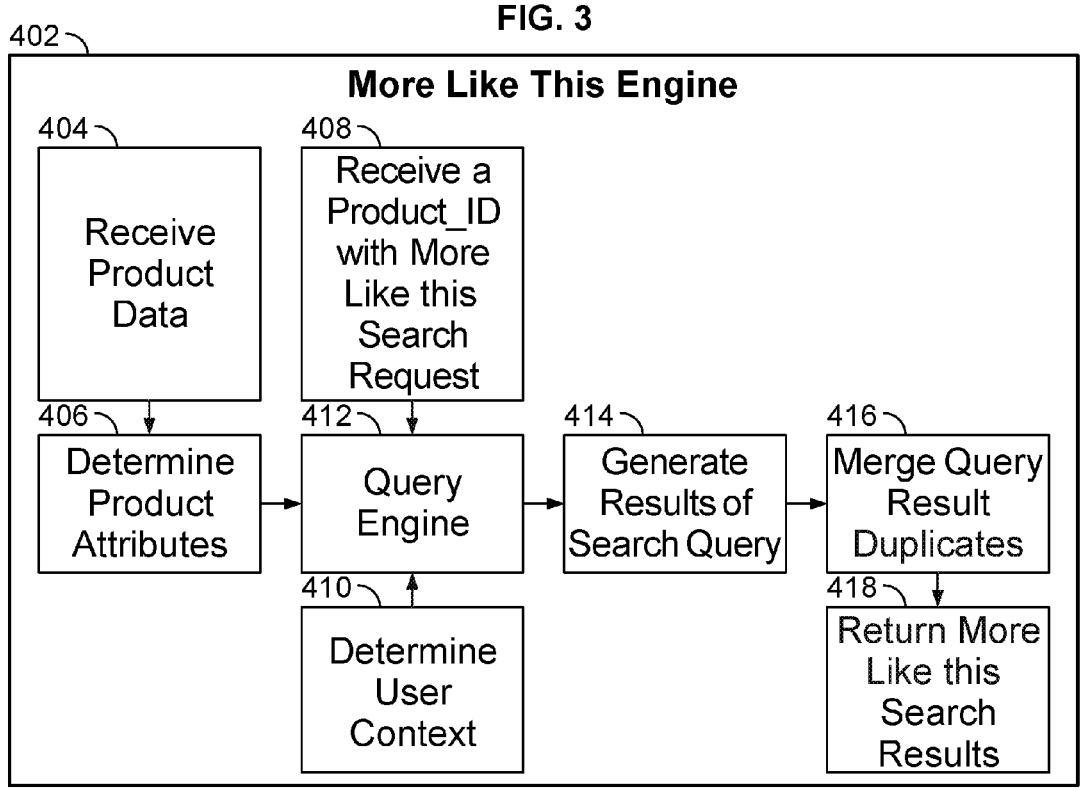
FIG. 4 is a functional block diagram illustrating a process flow of a more like this engine for providing search with more like this refinements in accordance with some embodiments.

FIG. 4 is a functional block diagram illustrating a process flow of a more like this engine for providing search with more like this refinements in accordance with some embodiments. In particular, FIG. 4 illustrates various components used for providing search with more like this refinements in accordance with some embodiments. As shown, a more like this engine 402 receives product data at 404 (e.g., such product data can be provided via an XML product and attributes data feed from each merchant as described above with respect to FIG. 2). The received product data is used to determine product attributes at 406. For example, the determined product attributes can include merchant specified attributes (e.g., as explicitly specified in a merchant catalog provided via the merchant's product and attributes data feed, such as a product catalog provided by the merchant). As another example, the product attributes can include derived product attributes, as discussed in more detail below. In addition, user context is determined at 410 using various techniques described herein. Product attributes can include a product identifier (product_ID), catalog identifier (catalog_ID), product name, brand name, price, size, availability, material, color, and/or other attributes, in which some of these attributes can be merchant specified attributes (e.g., product_ID, catalog_ID, etc.), and some of these attributes can be derived attributes (e.g., material, color, etc.).

As also shown, more like this engine 402 includes a query engine 412 for implementing a query formulation (e.g., weighting) and result ranking (e.g., re-ranking) In particular, more like this engine 402 receives a product or other item (e.g., a product_ID or other product identifier) with a more like this search request at 408 that along with the input from stage 406 and stage 410 is used to generate a search query using query engine 412. For example, the query engine can be implemented as a reverse search engine that can use product attribute (e.g., product attributes that are associated with the received product_ID) and user context input to generate one or more search queries. The product attribute and user context input can be translated into a set of words and associated weights (e.g., $\{(word_a, weight), \ldots, (word_i, weight_i)\}$), which can be used to generate a (weighted) search query for identifying more products that are more like the received product_ID. As discussed further below, such weights can be determined as a value that indicates a degree to which the word is uniquely associated with the product_ID (e.g., using term frequency-inverse document frequency (TF-IDF) and/or other techniques). In some implementations, a category that is determined to be associated with the identified product is also used to generate the search query. In some implementations, a product class that is determined to be associated with the identified product is also used to generate the search query.

As shown at 414, the search query generated at 412 is applied to the merchant's product catalog to identify products that match the search query. At 416, query result duplicates are merged (e.g., product results that are duplicated by search results received at 414 can be merged). In some implementations, additional processing can be performed to generate more like this search results, such as to promote or demote certain products and/or other techniques, as further described below. At 418, the resulting more like this search results are returned (e.g., the more like this search results with refinements can be returned to the merchant's web server, which can return one or more of such results to the user's web browser). Certain of these process stages are described in further detail below.

For example, more like this engine 402 can implement the more like this engine 320 described above with respect to FIG. 3, which can implement a more like this processing component of a more like this search service/system as similarly discussed above with respect to FIGS. 1 and 2.

In one embodiment, various attributes are determined for a product (406) (e.g., the candidate product, which is the product that is identified with the received product_ID (408), which was identified by a user's request for a more like this search request). These attributes can include merchant specified product attributes. These attributes can also include derived product attributes. These attributes are used to compute a match of similarity of the candidate product with all the products in the search index. In some implementations, the similarity match is computed using a function of the following attributes (e.g., some of which can be merchant specified product and others can be derived product attributes): product category, title, description, brand, shape, size, color, pattern, and material. As will now be apparent to one of ordinary skill in the art, various other attributes can be used to perform such a similarity function, which can vary based on merchant, product, and/or other criteria or contexts.

In one embodiment, product attributes includes derived product attributes. Various product attributes can be derived. For example, color can be a derived product attribute (e.g., assuming such is not a merchant specified product attribute). In order to extract and represent color information, image colors can be analyzed to represent the most important or most significant colors as a color palette. As another example, a material can be a derived product attribute (e.g., assuming such is not a merchant specified product attribute). In order to determine material information, keyword analysis can be performed on product descriptions to represent the most important or most significant material(s) associated with a given product. As will now be apparent to one of ordinary skill in the art, various other techniques can be used to derive product attributes using a product catalog, a merchant web site, and/or other data related to such products.

In one embodiment, query-time attributes input (e.g., attributes available and/or provided to the query engine at a time of the requested query—that is, when the more like this search request is received) to the query engine can also include user context input (410). For example, user context input can include a recent browsing history of the user. User context input can also include various other types of user context, such as implicit price preference of the user, implicit brand preference of the user, other domain specific preferences (e.g., local inventory availability for a shopper who is known to use location features), and/or various other types of user context data. Other examples of query-time attributes can include product class information as discussed above.

In one embodiment, recently viewed product and category information is stored in a cookie or a server session. The recently viewed product and category information can then be used as a hint to boost a score of products that match with the recent views. For example, if Bob recently viewed a golf club driver from PRO GOLF CLUBS Company, and while viewing a putter from another brand, Bob selects a more like this option (e.g., by selecting a button or other icon) in the web page to execute a search with more like this refinements to receive additional products similar to this product (e.g., other golf club driver products that have similar attributes), then the search with more like this refinements can use the user context information of Bob's recent browsing history of Bob's implicit preference for golf club equipment from PRO GOLF CLUBS Company as a hint to boost a score of putter products to identify additional putters that are from PRO GOLF CLUBS Company.

In one embodiment, the index-time attributes are used to generate the search query with appropriate weights for each attributes that are positively or negatively adjusted based on query-time attributes provided to the query engine. For example, a color of the product can be used as an index-time attribute. If the color of the product is a light color, then the such an index-time attribute can be used to negatively adjust for dark color item and/or to positively adjust for light color items.

In one embodiment, generating product classifications and associating products based on derived and/or merchant specified attributes is performed as an offline process as similarly discussed above with respect to FIG. 2. In some implementations, pixel logs/tags can be used as well as user profiles and other user context related information to generate user context input. For example, the user context input can be generated to facilitate determining products that are more like other products that the user has explicitly and/or implicitly indicated an interest in as further discussed below. For example, a real-time click-tracking mechanism can be used to create and maintain a profile of the user as he/she browses a merchant's web site, which can then be used to determine preferences of a user. In case of logged-in users or users whose profile can be inferred from, for example, email landing pages or prior visit history, a user profile can be augmented further with other data about the user's preferences.

Various other design related search and refinements are provided as will now be described. In particular, various quality signals can be provided to facilitate search with more like this refinements.

In one embodiment, a product rank (e.g., signal rank or ranking signal) of a product is provided. For example, the product rank can be used to indicate a query independent "importance" of the product. In some implementations, product conversion information (e.g., number of purchases for the product, revenue for the product, and/or other product conversion related data) plus page visit information for the product item (e.g., number of times users visited the product page(s) on the merchant's web site for the product item) can be used to generate a product rank value. For example, the product rank can be computed using a configurable algorithm that uses the following inputs: a number of page views of the product over one or more time periods (e.g., in some cases, with the importance decaying for older time periods, which can be configurable by the merchant based on the product item and/or generally for their products or types of products); a number of interactions the product has in a purchase funnel (e.g., add-to-cart, checkout, quantity purchased, sale, etc.); product review information; and/or product return information. In some implementations, such product ranking signals are used to generate products classes as described above.

In one embodiment, a field boost is provided such that for query matches that match strings in certain fields of a document (e.g., a web page or other content on a merchant's web site), a higher boost can be allocated to those matches with such certain fields of the document. For example, a title match can be weighted higher as opposed to description match. Example fields that can be allocated higher weighting include the following: color (e.g., color of the product item); item name (e.g., name of the product); manufacturer or brand name (e.g., product brand); and/or keywords. In some implementations, exact values allocated for such field boosts can be determined through various tuning operations (e.g., replay frequent/popular queries to determine such boost value(s) for various fields, which can vary for different fields, for different merchant web sites, and/or using various other feedback loop and testing techniques for tuning such boost value settings).

In one embodiment, the queries that lead to an item page are computed historically using pixel logs and add queries as a separate field to the document along with a boost proportional to the number of visits through these "navigational" queries. This approach can facilitate in obtaining information related to the item such as query variants, spelling mistakes, user description of product, etc.

In one embodiment, field boosts are provided, which can be computed as discussed above. For example, Solr allows setting a field boost value for each field in a document. In some implementations, this can be implemented as a global value as discussed above.

In one embodiment, a document boost is equal to the product rank of the product, which can be computed as discussed above.

In one embodiment, various document scoring techniques are provided. For example, the Solr Extended DisMax (eDisMax) query parser can be used to rewrite queries to generate appropriate scoring of documents. Query field boosts and phrase match boosts, as well as boosting using values retrieved from certain fields in the index can be implemented using an open source query parser, such as Solr eDisMax or another open source or commercially available query parser. As would now be apparent to one of ordinary skill in the art, exact values of these parameters can be tuned for different implementations.

In one embodiment, Term Frequency-Inverse Document Frequency (TF-IDF) techniques can be applied to generate weight values that are used to indicate a degree to which the word is uniquely associated with the product_ID. For example, TF-IDF can be used to determine that a term of "driver" used in a product description for a golf club is not a commonly used word for sporting goods products. In this example, the term of "driver" can be given a relatively high weight (e.g., 0.9 on a scale of 0 to 1.0) with the product_ID for this golf club driver product. However, there are certain terms, such as for a product color and/or other terms that may be frequently used terms but such are not uniquely associated with this product. As such, in this example, a common color word, such as black, can be determined to not be uniquely associated with this product and, thus, can be given a relatively low weight (e.g., 0.1 on a scale of 0 to 1.0) with the product_ID for this golf club driver product. As will now be apparent to one of ordinary skill in the art, various weighting values can be used to implement such TF-IDF techniques for determining weights for words to provide sets of words and associated weight values (e.g., {(word$_a$, weight$_a$), (word$_i$, weight)}) as described herein.

In one embodiment, manual overrides can be used for providing a more like this search with refinements. In various situations, manual overrides can be provided for certain more like this queries. In some implementations, use of the QueryElevationComponent feature of Solr can be used to implement such manual overrides. In particular, this feature allows for specifying queries and the list of products that should appear at the top for each of the more like this search results. For example, a merchant can configure such using a merchant override to allow for certain products to be promoted or featured (e.g., or, in some cases, demoted), which will then be automatically displayed at the top of a list of relevant more like this search results.

Figure 5:
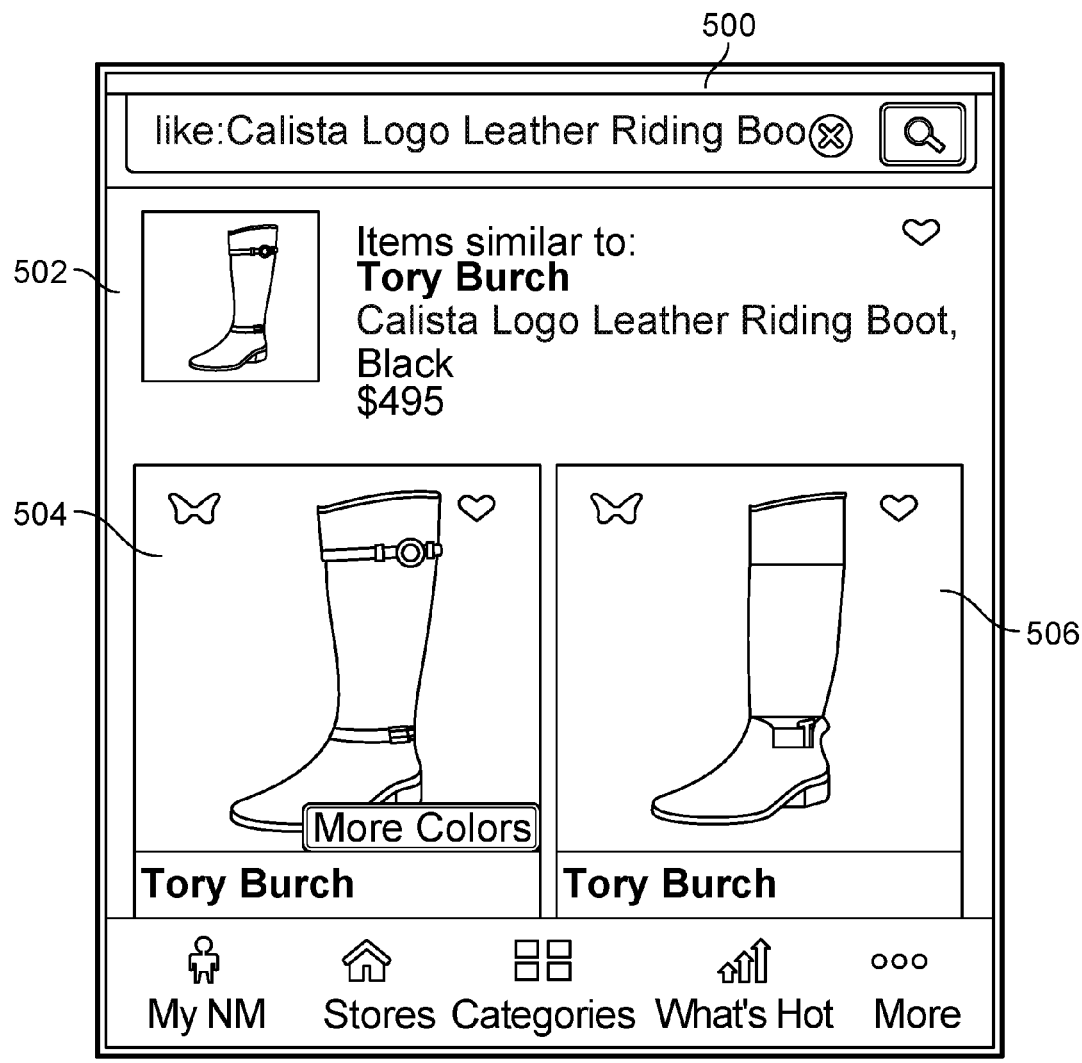
FIG. 5 is a screen diagram illustrating a graphical user interface (GUI) of a web interface for providing search with more like this refinements in accordance with some embodiments.

FIG. 5 is a screen diagram illustrating a graphical user interface (GUI) of a web interface for providing search with more like this refinements in accordance with some embodiments. In particular, FIG. 5 illustrates a screen image 500 of a front-end display associated with a search box (e.g., "like:Calista Logo Leather Riding Boots" in the search box), in which the search query shown in the search box is automatically populated in response to a user selecting a more like this search option for the product shown at 502, (e.g., showing a Calista® Logo Leather Riding Boots product). The results of the more like this search with refinements are shown at 504 and 506, in which the user can select more like this search with refinements to be performed with respect to either of these products by selecting the butterfly icon as shown. Various other formats and/or icons can be provided to provide a GUI for implementing more like this search with refinements as will now be apparent to one of ordinary skill in the art.

Figure 6A:
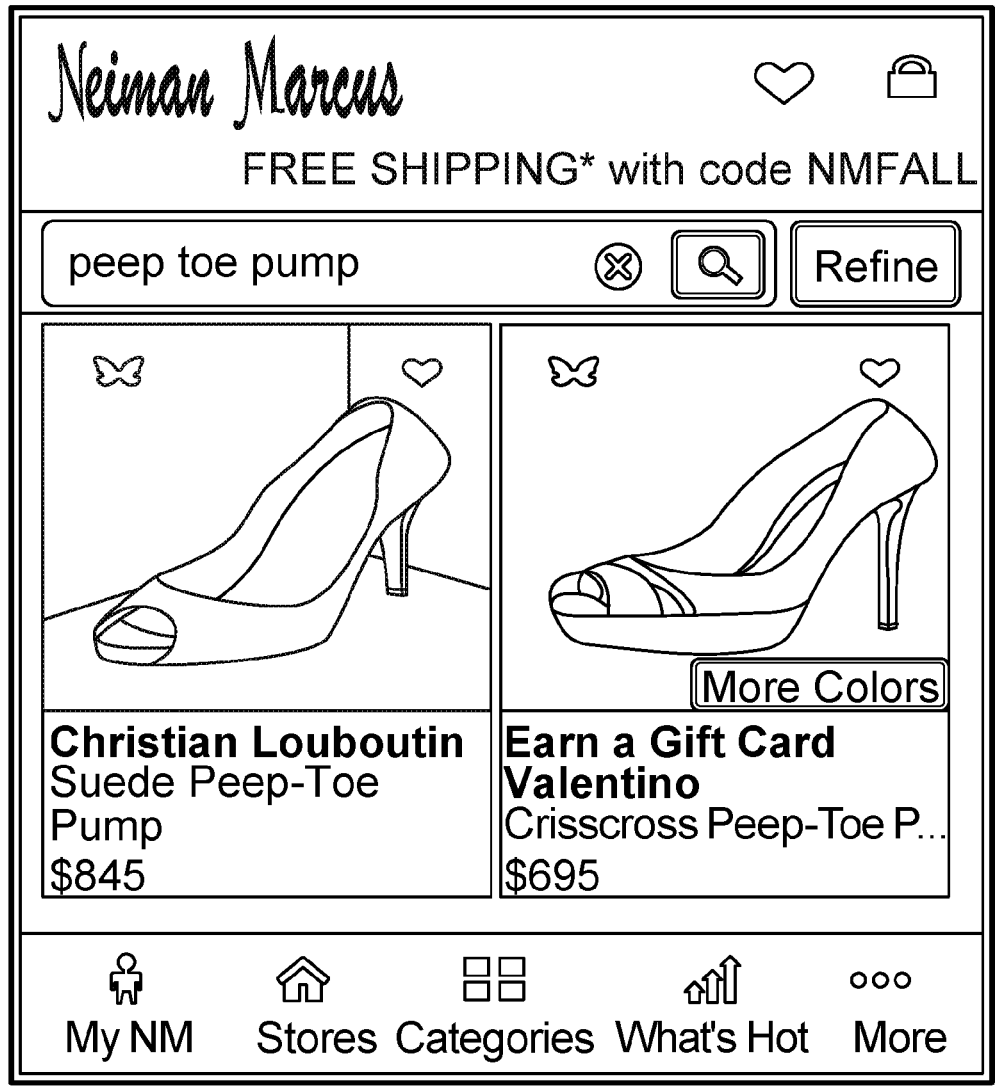
FIGS. 6A-6B are screen diagrams illustrating an example user flow for a search with more like this refinements in accordance with some embodiments.
Figure 6B:
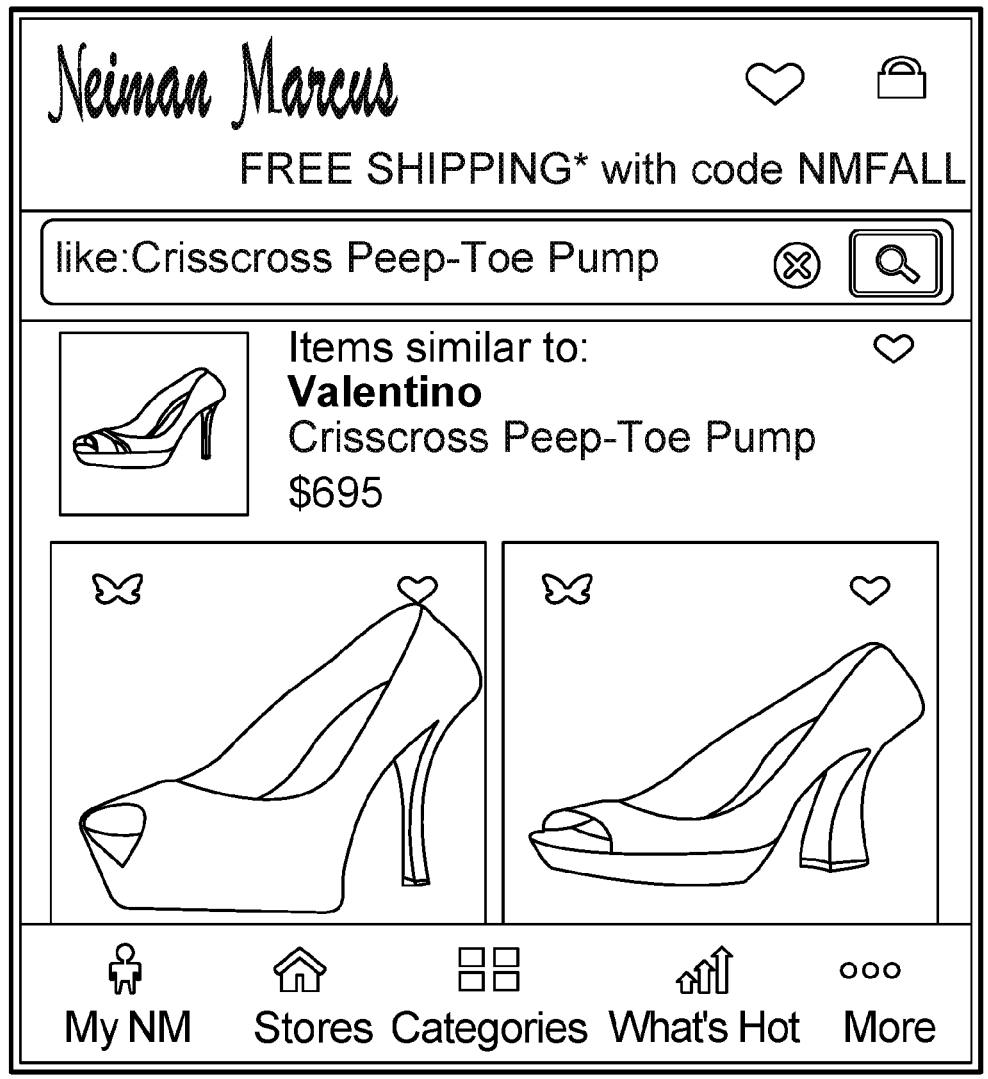

FIGS. 6A-6B are screen diagrams illustrating an example user flow for a search with more like this refinements in accordance with some embodiments. As shown in FIG. 6A, a user arrives on a category or search results page and selects a more like this search icon (e.g., shown as a butterfly in this GUI example) on a given product, such as the Valentino® shoe. As shown in FIG. 6B, the web browser then presents a more like this search results page with products that are similar to the Valentino® shoe.

Figure 7:
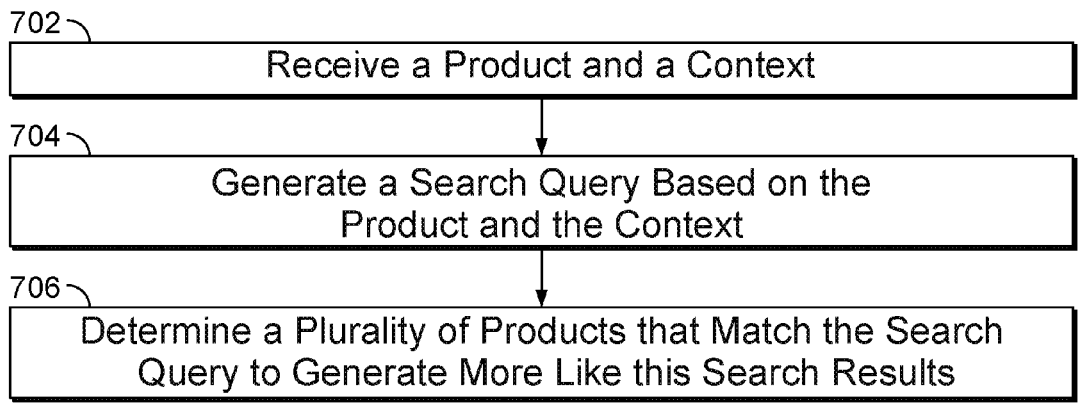
FIG. 7 is a flow diagram illustrating a process for providing search with more like this refinements in accordance with some embodiments.

FIG. 7 is a flow diagram illustrating a process for providing search with more like this refinements in accordance with some embodiments. In some embodiments, the process for providing search with more like this refinements is performed using the more like this search system/service described above with respect to FIGS. 1-4.

Referring to FIG. 7, at 702, a product and a context (e.g., the context can include related category information, user context, and/or other context related information) are received. At 704, generating a search query based on the product and the context is performed. At 706, determining a plurality of products that match the search query to generate more like this search results is performed.

Figure 8:
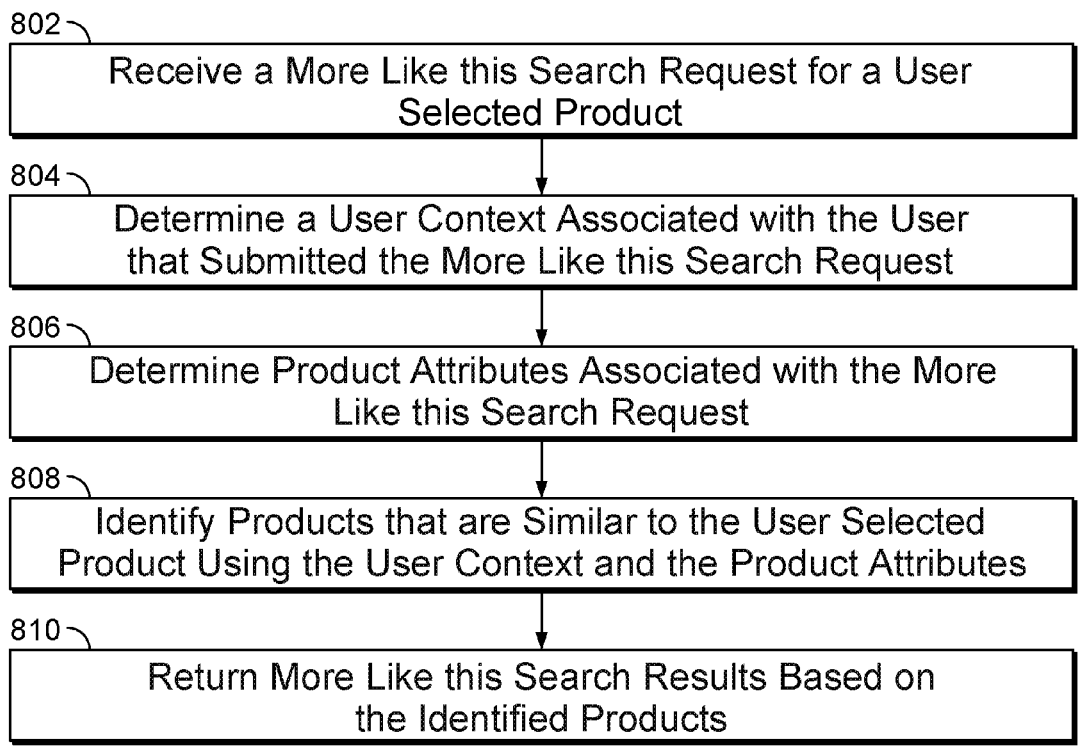
FIG. 8 is another flow diagram illustrating a process for providing search with more like this refinements in accordance with some embodiments.

FIG. 8 is another flow diagram illustrating a process for providing search with more like this refinements in accordance with some embodiments. In some embodiments, the process for providing search with more like this refinements is performed using the more like this search system/service described above with respect to FIGS. 1-4.

Referring to FIG. 8, at 802, a more like this search request for a user selected product is received. For example, the user selected product can be identified by a product identifier (e.g., product_ID or other unique identifier can be used).

At 804, determining a user context associated with the user that submitted the more like this search request is performed. For example, the user context can include user profile related user information (e.g., user preferences, user purchase history, and/or other user profile related information), and the user context can also include monitored user session history (e.g., using pixel log data or other techniques to monitor a user browsing history).

At 806, determining product attributes associated with the more like this search request is performed. For example, the product attributes can include merchant specified product attributes (e.g., specified in a merchant catalog), and the product attributes can also include derived product attributes (e.g., which can be derived attribute data as described herein).

At 808, identifying products that are similar to the user selected product using the user context and the product attributes is performed. For example, various techniques for generating a query using a reverse search engine as discussed above can be implemented to identify products provided by the merchant's catalog that are similar to the user specified product based on the associated product attributes and user context data. In some cases, similar products can be identified based on a generated product class that is associated with the identified product and includes other products that are associated with the generated product class.

At 810, the more like this search results based on the identified products are returned. For example, the more like this search results can be returned to the merchant's web site, which returns the more like this search results to the user's browser for presentation via a browser GUI executed on the user's computing device.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for search with more like this refinements, comprising:
   a processor configured to:
      receive a product and a context;
      determine a product class, comprising to:
         weigh a first product by a first weight to obtain a first weighted product, the first weight relating to a strength of association of the first product to the product class;
         weigh a second product by a second weight to obtain a second weighted product, the second weight relating to a strength of association of the second product to the product class; and
         determine the product class based at least in part on the first and second weighted products and a function;
      generate a search query based on the product, the product class, and the context;
      determine a field boost associated with the search query, comprising to:
         determine a first match of a first string of the search query with a first field of a merchant's web page including the product;
         determine a second match of a second string of the search query with a second field of the merchant's web page including the product, the first field being different from the second field;
         weigh the first field with a third weight to obtain a first weighted field;
         weigh the second field with a fourth weight to obtain a second weighted field, the third weight being different from the fourth weight; and
         obtain the field boost based at least in part on the first and second weighted fields; and
      determine a plurality of products that match the search query to generate more like this search results, wherein the plurality of products that match the search query is determined based at least in part on the field boost; and
   a memory coupled to the processor and configured to provide the processor with instructions.

2. The system recited in claim 1, wherein the memory is further configured to:
   receive a product identifier to uniquely identify the product.

3. The system recited in claim 1, wherein the memory is further configured to:
   determine a user context.

4. The system recited in claim 1, wherein the memory is further configured to:
   determine a user context, wherein the user context includes user profile information.

5. The system recited in claim 1, wherein the memory is further configured to:
   determine a user context, wherein the user context includes user browsing history information.

6. The system recited in claim 1, wherein the memory is further configured to:
   determine a user context, wherein the search query is generated based on the user context.

7. The system recited in claim 1, wherein the memory is further configured to:
   determine a product attribute associated with the product.

8. The system recited in claim 1, wherein the memory is further configured to:
   determine a product attribute associated with the product, wherein the product attribute is a merchant specified product attribute.

9. The system recited in claim 1, wherein the memory is further configured to:
   determine a product attribute associated with the product, wherein the product attribute is a derived product attribute.

10. The system recited in claim 1, wherein the memory is further configured to:
    determine a product attribute associated with the product, wherein the search query is generated based on the product attribute.

11. The system recited in claim 1, wherein the function relates to a decaying algorithm.

12. A method of search with more like this refinements, comprising:
    receiving a product and a context;
    determining a product class, comprising:
       weighing a first product by a first weight to obtain a first weighted product, the first weight relating to a strength of association of the first product to the product class;
       weighing a second product by a second weight to obtain a second weighted product, the second weight relating to a strength of association of the second product to the product class; and determining the product class based at least in part on the first and second weighted products and a function;

generating a search query based on the product, the product class, and the context;

determining a field boost associated with the search query, comprising to:

determining a first match of a first string of the search query with a first field of a merchant's web page including the product;

determining a second match of a second string of the search query with a second field of the merchant's web page including the product, the first field being different from the second field;

weighing the first field with a third weight to obtain a first weighted field;

weighing the second field with a fourth weight to obtain a second weighted field, the third weight being different from the fourth weight; and obtaining the field boost based at least in part on the first and second weighted fields; and determining a plurality of products that match the search query to generate more like this search results, wherein the plurality of products that match the search query is determined based at least in part on the field boost.

13. The method of claim 12, further comprising:
receiving a product identifier to uniquely identify the product.

14. The method of claim 12, further comprising:
determining a user context.

15. The method of claim 12, further comprising:
determining a user context, wherein the user context includes user profile information.

16. The method of claim 12, further comprising:
determining a user context, wherein the user context includes user browsing history information.

17. The method of claim 12, further comprising:
determining a user context, wherein the search query is generated based on the user context.

18. The method of claim 12, further comprising:
determining a product attribute associated with the product.

19. The method of claim 12, further comprising:
determining a product attribute associated with the product, wherein the product attribute is a merchant specified product attribute.

20. The method of claim 12, further comprising:
determining a product attribute associated with the product, wherein the product attribute is a derived product attribute.

21. The method of claim 12, further comprising:
determining a product attribute associated with the product, wherein the search query is generated based on the product attribute.

22. The method of claim 12, wherein the function relates to a decaying algorithm.

23. A computer program product for search with more like this refinements, the computer program product comprising a tangible non-transitory computer readable storage medium and comprising computer instructions for:

receiving a product and a context;

determining a product class, comprising:

weighing a first product by a first weight to obtain a first weighted product, the first weight relating to a strength of association of the first product to the product class;

weighing a second product by a second weight to obtain a second weighted product, the second weight relating to a strength of association of the second product to the product class; and determining the product class based at least in part on the first and second weighted products and a function;

generating a search query based on the product, the product class, and the context;

determining a field boost associated with the search query, comprising to:

determining a first match of a first string of the search query with a first field of a merchant's web page including the product;

determining a second match of a second string of the search query with a second field of the merchant's web page including the product, the first field being different from the second field;

weighing the first field with a third weight to obtain a first weighted field;

weighing the second field with a fourth weight to obtain a second weighted field, the third weight being different from the fourth weight; and obtaining the field boost based at least in part on the first and second weighted fields; and determining a plurality of products that match the search query to generate more like this search results, wherein the plurality of products that match the search query is determined based at least in part on the field boost.

24. The computer program product recited in claim 23, further comprising computer instructions for:
receiving a product identifier to uniquely identify the product.

25. The computer program product recited in claim 23, further comprising computer instructions for:
determining a user context.

26. The computer program product recited in claim 23, further comprising computer instructions for:
determining a user context, wherein the user context includes user profile information.

27. The computer program product recited in claim 23, further comprising computer instructions for:
determining a user context, wherein the user context includes user browsing history information.

28. The computer program product recited in claim 23, further comprising computer instructions for:
determining a user context, wherein the search query is generated based on the user context.

29. The computer program product recited in claim 23, further comprising computer instructions for:
determining a product attribute associated with the product.

30. The computer program product recited in claim 23, further comprising computer instructions for:
determining a product attribute associated with the product, wherein the product attribute is a merchant specified product attribute.

31. The computer program product recited in claim 23, further comprising computer instructions for:
determining a product attribute associated with the product, wherein the product attribute is a derived product attribute.

32. The computer program product recited in claim 23, further comprising computer instructions for:
   determining a product attribute associated with the product, wherein the search query is generated based on the product attribute.

33. The computer program product recited in claim 23, wherein the function relates to a decaying algorithm.

\* \* \* \* \*